UNITED STATES PATENT OFFICE.

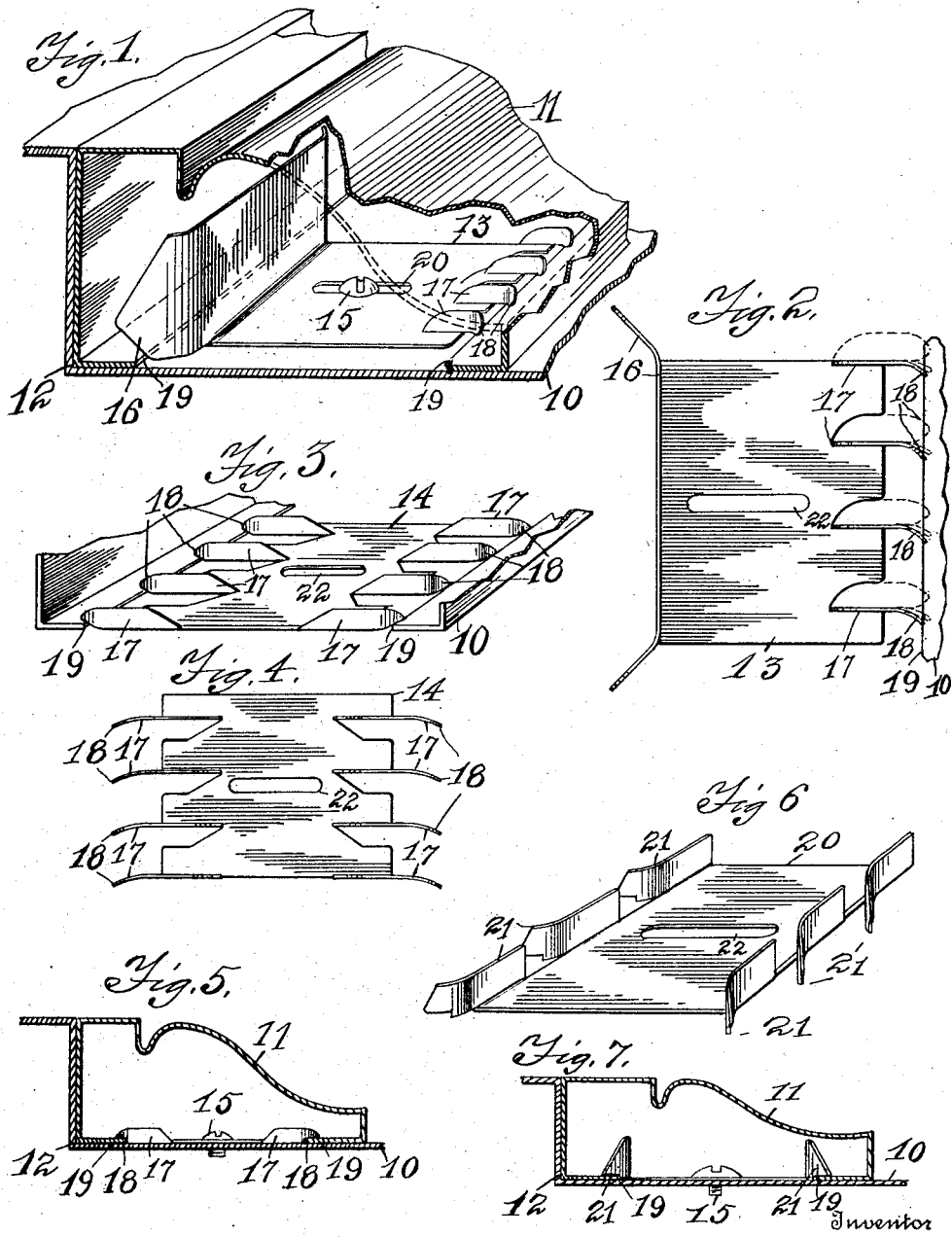

OTHO M. OTTE, OF JAMESTOWN, NEW YORK.

RESILIENT HOLDING-CLIP.

1,223,289. Specification of Letters Patent. Patented Apr. 17, 1917.

Application filed October 18, 1916. Serial No. 126,303.

*To all whom it may concern:*

Be it known that I, OTHO M. OTTE, a citizen of the United States, residing at the city of Jamestown, in the county of Chautauqua and State of New York, have invented certain new and useful Improvements in Resilient Holding-Clips, of which the following, taken in connection with the accompanying drawings, is a specification.
The invention relates to holding devices for hollow metallic molding and similar constructions, and is kindred to the construction shown in my application for Letters Patent Serial No. 109,643, filed July 17th, 1916; and the object of the improvement is to provide a holding or attaching clip having multiple teeth on one or both sides upon which the molding or hollow sheet metal work may be sprung by pressing directly onto the same or by endwise movement under the plurality of teeth or spring projections to thereby removably hold the molding or sheet metal work; and the invention consists in the novel features and combinations hereinafter set forth and claimed.

In the drawings, Figure 1 is a perspective sectional view of a portion of a sheet metal angle with a portion of the hollow metal molding fitting said angle and retained thereon by the one sided multiple toothed holding clip shown in Fig. 2 with the edge of the sheet metal work retained beneath the plurality of spring teeth along one side of said clip, the manner in which said spring teeth are cut from the sheet metal and turned edgewise being shown in dotted outline. Fig. 2 is a top plan view of the clip. Fig. 3 is a perspective view of the double form of multiple toothed holding clip showing the multiple spring teeth holding the sheet metal along each edge; and Fig. 4 is a top plan view of the same showing the construction and arrangement of the same; and Fig. 5 is a sectional view of a piece of sheet metal and the molding fitting in the corner angle thereof locked in place by the notched double multiple toothed holding clip which is attached to the sheet metal. Fig. 6 is a perspective view of a modification of the double sided multiple notch toothed holding clip in which the teeth are turned up lengthwise of the edges of the holding clip plate, the ends of the teeth being turned out to form spring teeth instead of being cut horizontally out of the plate as in the form shown in Figs. 3, 4 and 5; and Fig. 7 is an endwise elevation of the modified form shown in Fig. 6 in position within the molding similar to Fig. 5, the notched ends locking over the edges of the sheet metal molding.

Like characters of reference refer to corresponding parts in the several views.

The numeral 10 designates the piece of sheet metal to which the hollow metallic molding 11 is to be attached. The angle 12 in the sheet metal is similar to that in a sheet metal door panel or in sheet metal work of any kind in which panel work is used.

It is preferable to form the molding 11 in a continuous frame to fit within the angle 12 of the panel. In order to attach said molding frame it must be pressed directly toward the sunken sheet metal panel within the sunken portion formed by the angle 12. Accordingly, a series of one sided resilient multiple toothed sheet metal clips 14 are attached to the sheet metal plate 10 by suitable screws 15 through an adjusting slot 22 in the sheet metal clips 13 or 14 so that they may be alined.

The single or double sided multiple toothed clips are used according to the sheet metal work. When less resiliency is desired in holding the hollow metallic molding 11, the single sided multiple tooth clip 13 is used, a stiff upraised side 16 being provided for one side of the single sided clip 13; but where greater resiliency in the holding of the sheet metal is desired, the double sided multiple toothed clip 14 is preferred.

The multiple teeth 17 are preferably cut out from the sheet metal plate so that when raised to the edgewise position they extend at right angles to the clip as they extend toward the edge 19 of the molding 11. The outer ends 18 of the teeth 17 are preferably pointed or rounded so that the spaced edges 19 of the sheet metal molding will easily spring over the same. Said points are also slightly turned to one side, all of said points being turned in the same direction so that the edges 19 may be slipped endwise beneath the series of teeth 17 or may be pressed straight onto the teeth 17, said teeth springing to one side sufficiently to permit the edge 19 passing over or under the same, as shown in dotted line in Fig. 2.

It is apparent that the spaced teeth 17 extending edgewise toward the edge 19 have a strong holding capacity, though each individual tooth 17 does not have a great capacity of itself yet the series of spaced teeth along each edge forms a simple clip which can be easily struck from the sheet metal by suitable dies into the form shown providing a convenient and exceedingly resilient clip which is peculiarly adjustable yet holds the molding very firmly in place when once it is pressed over the same, and the teeth being struck out of the sheet metal do not take a large amount of material, hence the clip can be made cheaply and easily and is exceedingly durable and convenient in use.

The modified form 20 of the multiple toothed holding clip shown in Figs. 6 and 7 is shown in the double sided holding clip form substantially the same as the form shown in Figs. 3, 4 and 5. The clip 20 has the teeth 21 cut from a flange turned lengthwise along the edges of the sheet metal plate. The teeth 21 are formed by cutting the consecutive ends into pointed form necessary to permit the edges 19 being sprung over the same. Said ends are turned outwardly sufficient to give the required amount of resilience, thereby providing a very simple and strong clip yet one in which the teeth 21 do not have quite the retaining strength that the teeth 18 possess since the teeth 18 are at nearly right angles to the edges 19 thereby holding very firmly upon the same.

It is obvious that in such a multiple toothed clip the teeth 18 or 21 are so resilient that they will be easily sprung into holding contact with the edges 19 of the sheet metal molding without springing the edges 19 of the molding 11 out of line yet holding very firmly over a considerable portion of said edges 19 thereby attaching the molding very strongly to the sheet metal plate 10.

The stiff side 16 for the single sided multiple holding clip 13 is often preferred for certain forms of molding to hold them rigidly in the corner of an angle similar to the angle 12 shown in Fig. 1, and it is apparent that if the turned ends of the stiff angular flange 16 are pointed or inclined with sufficient room beneath the points thereof for the edge 19, the molding 11 can be pressed directly onto the same, the multiple points 18 accommodating the stiff angular flange 16 in attaching the molding.

The teeth 17 may be made pointed as shown in Figs. 1, 2 and 3 so that the inturned edges 19 are removable from said teeth, that is, the points 18 of the teeth 17 hold firmly against the edges 19 but being inclined upward permit the edge 19 being sprung from beneath the points 18. It is sometimes desirable, however, that while the molding or sheet metal work 11 with the spaced inturned edges 19 is sprung over the resilient teeth 17 or 21 yet when so sprung into position said edges 19 should be held firmly so that they cannot be jarred out of line or holding contact, as upon railway cars and similar constructions. Accordingly for such constructions, a notch 23 is provided on the under side of each of the teeth 17 or 21 as shown in Figs. 5, 6 and 7 into which the edges 19 spring and might be used on the stiff flange 16. It is apparent that the sheet metal work or molding 11 would have to be destroyed in order to force said edges 19 out of the notched spring ends 23 when once sprung into holding engagement therewith.

My spring teeth may therefore be made removable or non-removable according as it is desired to removably hold the sheet metal or to lock it in position so that it cannot be removed by the simple change in the formation of the underside of the point of the spring teeth 17 or 21 or flange 16.

I claim as new:—

1. The combination of hollow sheet metal work having spaced inturned edges, a holding clip having a slot therein for adjustable attachment, and resilient projections on said clip having inclined notched ends to allow said inturned edges to move over said ends of said projections into locking engagement with said notched ends.

2. The combination of hollow sheet metal work having spaced inturned edges, a sheet metal holding clip having a plurality of spring teeth along each lateral edge portion, said spring teeth extending edgewise beyond said lateral edge portion of said clip and having inclined ends on the upper side and the underside cut away in a notch to press said spaced inturned edges down said inclined ends into holding engagement with said notches.

3. A connecting clip for sheet metal including a plate and a series of teeth thereon set on edge and having their outer ends curved and free and projecting beyond the body of the plate.

4. A connecting clip for sheet metal composed of a plate, and a member connected to said plate at substantially right angles thereto, said member having each of its ends extending outwardly away from the member and formed to provide grips on the inner side edges of its said ends.

5. A connecting clip for sheet metal having edge securing parts composed of a plate adapted to be secured so as to lie in the plane of the edge part of the sheet metal, a tooth connected to the plate, said tooth extending beyond the body of the plate so as to provide a longitudinal side gripping edge and being connected to the plate so that the plane of the tooth is at substantially right angles to the edge part of the sheet metal engaged by said gripping edge.

6. A connecting clip for sheet metal composed of a plate, and a gripping member disposed in a plane at right angles to the plane of the plate and having its inner longitudinal edge connected at one end to the plate and having the outer end of said longitudinal edge free and projecting beyond the adjacent edge of the plate.

In testimony whereof I have affixed my signature in the presence of two witnesses.

OTHO M. OTTE.

Witnesses:
H. A. SANDBERG,
J. E. NORDSTROM.

Copies of this patent may be obtained for five cents each, by addressing the "Commissioner of Patents, Washington, D. C."